United States Patent
Lee et al.

(10) Patent No.: US 11,626,763 B2
(45) Date of Patent: Apr. 11, 2023

(54) ELECTRONIC DEVICE FOR REMOVING, FROM DATA COMMUNICATION SIGNAL, INTERFERENCE DUE TO WIRELESS POWER AND OPERATING METHOD THEREFOR

(71) Applicant: SAMSUNG ELECTRONICS CO., LTD., Suwon-si (KR)

(72) Inventors: Seunghyun Lee, Suwon-si (KR); Jaeseok Park, Suwon-si (KR); Chongmin Lee, Suwon-si (KR); Sungbum Park, Suwon-si (KR); Sanghyuk Wi, Suwon-si (KR); Youngho Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 148 days.

(21) Appl. No.: 17/262,529

(22) PCT Filed: Sep. 2, 2019

(86) PCT No.: PCT/KR2019/011258
§ 371 (c)(1),
(2) Date: Jan. 22, 2021

(87) PCT Pub. No.: WO2020/050567
PCT Pub. Date: Mar. 12, 2020

(65) Prior Publication Data
US 2021/0313843 A1 Oct. 7, 2021

(30) Foreign Application Priority Data
Sep. 4, 2018 (KR) .................. 10-2018-0105562

(51) Int. Cl.
*H02J 50/80* (2016.01)
*H02J 50/20* (2016.01)
(Continued)

(52) U.S. Cl.
CPC .............. *H02J 50/80* (2016.02); *H02J 50/20* (2016.02); *H02J 50/402* (2020.01); *H04B 1/123* (2013.01); *H04B 5/0037* (2013.01)

(58) Field of Classification Search
CPC .. H02J 50/80; H02J 50/20; H02J 50/40; H02J 50/402; H04B 1/123; H04B 5/0037; H04L 25/03006; H04L 25/0202
See application file for complete search history.

(56) References Cited

U.S. PATENT DOCUMENTS

| 6,404,760 B1 | 6/2002 | Holtzman et al. |
| 2002/0057728 A1* | 5/2002 | Yellin ................. H04B 1/7115 375/148 |

(Continued)

FOREIGN PATENT DOCUMENTS

| KR | 10-2015-0129313 | 11/2015 |
| KR | 10-2017-0010631 | 2/2017 |

(Continued)

OTHER PUBLICATIONS

Extended Search Report dated May 6, 2021 in counterpart EP Application No. 19857993.0.

(Continued)

*Primary Examiner* — Daniel Cavallari
*Assistant Examiner* — Rasem Mourad
(74) *Attorney, Agent, or Firm* — Nixon & Vanderhye, P.C.

(57) ABSTRACT

According to various embodiments, an electronic device comprises: a communication circuit for receiving a data communication signal including an interference signal by means of a power signal generated by a wireless power transmission device; and at least one processor, wherein the at least one processor can be configured to receive information related to the power signal from the wireless power (Continued)

transmission device through the communication circuit, estimate information about a channel with the wireless power transmission device, and use the communication circuit so as to remove, before decoding the data communication signal, the interference signal from the data communication signal on the basis of the information related to the power signal and the information about the channel Other various embodiments are possible.

14 Claims, 10 Drawing Sheets

(51) Int. Cl.
　　*H02J 50/40*　　(2016.01)
　　*H04B 1/12*　　(2006.01)
　　*H04B 5/00*　　(2006.01)

(56) References Cited

U.S. PATENT DOCUMENTS

| | | | |
|---|---|---|---|
| 2013/0162051 A1* | 6/2013 | Michihata | H02J 50/80 307/104 |
| 2013/0235911 A1* | 9/2013 | Geirhofer | H04L 1/0026 375/219 |
| 2014/0269873 A1 | 9/2014 | Tahir et al. | |
| 2015/0055612 A1 | 2/2015 | Tanaka | |
| 2015/0318976 A1 | 11/2015 | Eltawil et al. | |
| 2016/0112839 A1* | 4/2016 | Choi | H04W 4/80 455/41.2 |
| 2016/0148265 A1* | 5/2016 | Lim | G06Q 30/0269 705/14.55 |
| 2016/0380482 A1 | 12/2016 | Liu | |
| 2017/0104506 A1 | 4/2017 | Liu et al. | |
| 2017/0118714 A1* | 4/2017 | Kaechi | H04B 5/0037 |
| 2017/0222478 A1* | 8/2017 | Xu | H02J 50/10 |
| 2018/0076904 A1* | 3/2018 | Tomkins | H04L 25/08 |
| 2018/0213487 A1 | 7/2018 | Chae et al. | |
| 2019/0014546 A1* | 1/2019 | Wu | H04L 25/03006 |
| 2019/0372740 A1 | 12/2019 | Seol et al. | |

FOREIGN PATENT DOCUMENTS

| | | |
|---|---|---|
| KR | 10-2018-0055692 | 5/2018 |
| KR | 10-2018-0093498 | 8/2018 |

OTHER PUBLICATIONS

Zhou et al., Wireless Power Meets Energy Harvesting: A Joint Energy Allocation Approach in OFDM-Based System, IEEE Transactions on Wireless Communications, vol. 15, No. 5, May 2016 (11 pages).
International Search Report for PCT/KR2019/011258 dated Dec. 10, 2019, 5 pages.
Written Opinion of the ISA for PCT/KR2019/011258 dated Dec. 10, 2019, 5 pages.

* cited by examiner

ELECTRONIC DEVICE FOR REMOVING, FROM DATA COMMUNICATION SIGNAL, INTERFERENCE DUE TO WIRELESS POWER AND OPERATING METHOD THEREFOR

This application is the U.S. national phase of International Application No. PCT/KR2019/011258 filed Sep. 2, 2019 which designated the U.S. and claims priority to KR Patent Application No. 10-2018-0105562 filed Sep. 4, 2018, the entire contents of each of which are hereby incorporated by reference.

BACKGROUND

1. Field

The disclosure relates to an electronic device for removing interference by wireless power from a data communication signal and a method of operating the same.

2. Description of Related Art

An electronic device may perform data communication for transmitting and receiving a data signal with another electronic device. As the number of electronic devices performing wireless communication increases, data signals transmitted and received in a limited wireless frequency environment may cause an interference effect therebetween, and there are various technologies for removing the interference effect.

Recently, according to the development of technologies of a wireless power transmission system with the development of technologies of data communication, the number of wireless power transmission devices is increasing. A frequency band used for wireless power transmission by wireless power transmission devices may overlap a frequency band used for data communication by electronic devices.

SUMMARY

When wireless power transmission is performed by a wireless power transmission device while an electronic device performs data communication, wireless power transmission using relatively high transmission power may cause an interference effect to the data communication and thus data communication performance may deteriorate.

Various embodiments may provide an electronic device for removing interference by wireless power from a data communication signal on the basis of information related to a power signal and information on a channel with a wireless power transmission device before decoding the data communication signal converted into a digital signal after converting the data communication signal into the digital signal in a digital area, and a method of operating the same.

In accordance with an aspect of the disclosure, an electronic device includes: a communication circuit configured to receive a data communication signal including an interference signal caused by a power signal generated by a wireless power transmission device; and at least one processor, wherein the at least one processor is configured to receive information related to the power signal from the wireless power transmission device through the communication circuit, estimate information on a channel with the wireless power transmission device, and remove the interference signal from the data communication signal, based on the information related to the power signal and the information on the channel before decoding the data communication signal through the communication circuit.

In accordance with another aspect of the disclosure, a method of operating an electronic device removing an interference signal includes: receiving a data communication signal including an interference signal caused by a power signal generated by a wireless power transmission device; receiving information related to the power signal from the wireless power transmission device through a communication circuit and estimating information on a channel with the wireless power transmission device; and removing the interference signal from the data communication signal, based on the information related to the power signal and the information on the channel before decoding the data communication signal through the communication circuit.

In accordance with another aspect of the disclosure, a computer-readable recording medium recording a program for performing a method of operating an electronic device including a communication circuit, at least one processor operatively connected to the communication circuit, and a memory is provided. The method includes: receiving a data communication signal including an interference signal caused by a power signal generated by a wireless power transmission device; receiving information related to the power signal from the wireless power transmission device through a communication circuit and estimating information on a channel with the wireless power transmission device; and removing the interference signal from the data communication signal, based on the information related to the power signal and the information on the channel before decoding the data communication signal through the communication circuit.

According to various embodiments, it is possible to prevent deterioration of the performance of data communication by removing interference by wireless power from a data communication signal before the data communication signal converted into a digital signal is decoded.

MODE FOR CARRYING OUT THE INVENTION

Hereinafter, various embodiments of the disclosure will be described with reference to the accompanying drawings. However, this does not limit the disclosure to specific embodiments, and it should be understood that various modifications, equivalent, and/or alternative of embodiments of the disclosure are included.

Figure 1:
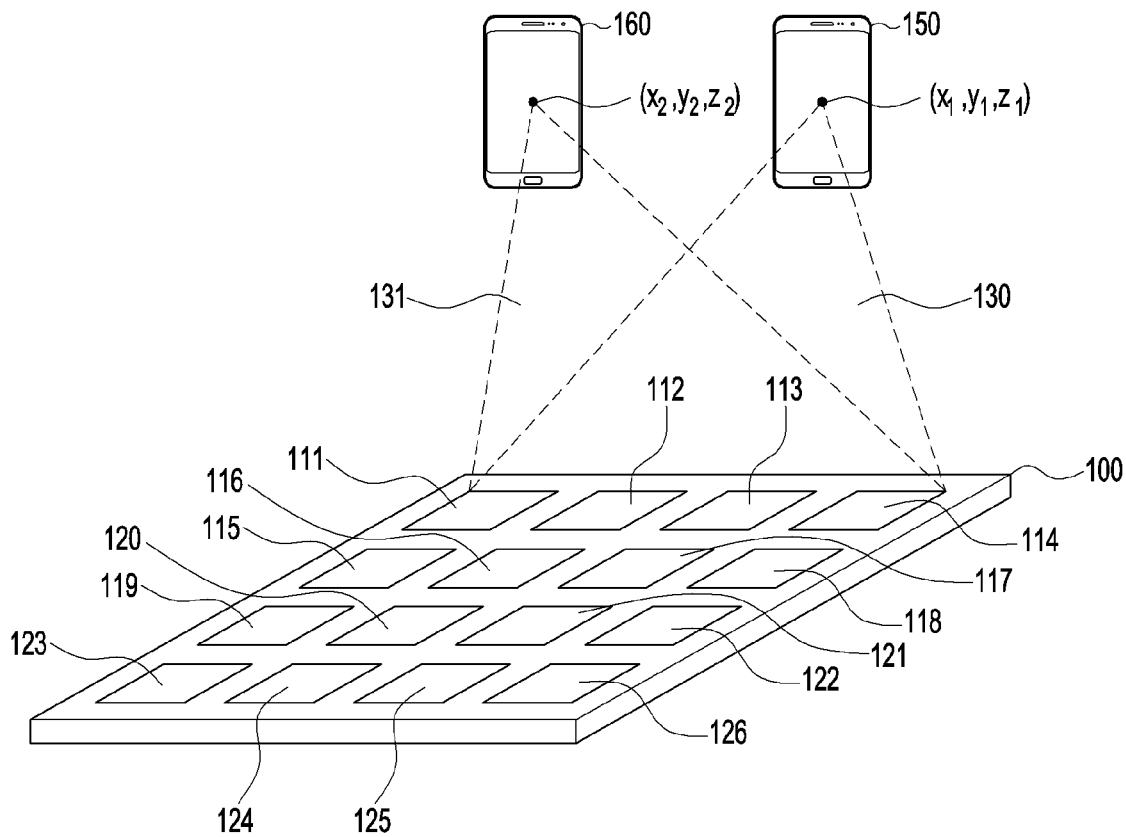
FIG. 1 is a conceptual diagram illustrating a wireless power transmission system according to various embodiments of the disclosure.

FIG. 1 is a conceptual diagram illustrating a wireless power transmission system according to various embodiments of the disclosure.

A wireless power transmission device 100 may wirelessly transmit power to at least one electronic device 150 and 160. According to various embodiments of the disclosure, the wireless power transmission device 100 may include a plurality of patch antennas 111 to 126. There is no limitation on the plurality of patch antennas 111 to 126 as long as the antennas generate a power signal (RF wave). For example, the plurality of patch antennas 111 to 126 may be implemented as a plurality of patch-type antennas arranged on the same plane as illustrated in FIG. 1, but are not limited to the illustrated arrangement type, number, or antenna type, and various arrangement types and various numbers of patch-type antennas, for example, a plurality of dipole antennas, a plurality of monopole antennas, or a plurality of parabolic antennas may be implemented. At least one of the amplitude and the phase of the power signal generated by the plurality of patch antennas 111 to 126 may be controlled by the wireless power transmission device 100. For convenience of description, the power signal generated by each of the patch antennas 111 to 126 is named a sub power signal.

According to various embodiments of the disclosure, the wireless power transmission device 100 may control at least one of the amplitude and the phase of each of the sub power signals generated by the patch antennas 111 to 126. Meanwhile, the sub power signals may interfere with each other. For example, the sub power signals may act as constructive interference at one position, and act as destructive interference at another position. The wireless power transmission device 100 according to various embodiments of the disclosure may control at least one of the amplitude and the phase of each of the sub power signals generated by the patch antennas 111 to 126 so that the sub power signals act as constructive interference at a first position $(x_1, y_1, z_1)$.

For example, the wireless power transmission device 100 may determine that the electronic device 150 or 160 is arranged at a first position $(x_1, y_1, z_1)$. The location of the electronic device 150 or 160 may be, for example, a position at which a power reception antenna of the electronic device 150 or 160 is located. A configuration in which the wireless power transmission device 100 determines the location of the electronic device 150 and 160 will be described below in more detail. In order to wirelessly receive power with high transmission efficiency by the electronic device 150 or 160, the sub power signals should act as constructive interference at the first position $(x_1, y_1, z_1)$. Accordingly, the wireless power transmission device 100 may control the patch antennas 111 to 126 such that the sub power signals act as constructive interference at the first position $(x_1, y_1, z_1)$. Controlling the patch antennas 111 to 126 may mean controlling the size of signals input to the patch antennas 111 to 126 or controlling the phase (or the delay) of signals input to the patch antennas 111 to 126. Meanwhile, those skilled in the art may readily understand beamforming which is a technology for controlling power signals to act as constructive interference at a particular position. Additionally, those skilled in the art may readily understand that the type of beamforming used in the disclosure is not limited. Various beamforming methods may be used, such as methods disclosed in U.S. patent Publication No. 2016/0099611, U.S. patent Publication No. 2016/0099755, U.S. patent Publication No. 2016/0100124, and the like. The form of power signals formed by beamforming may be referred to as pockets of energy.

Accordingly, a power signal 130 formed by the sub power signals may have the maximum amplitude at the first position $(x_1, y_1, z_1)$, and thus the electronic device 150 or 160 may receive wireless power with high efficiency. Meanwhile, the wireless power transmission device 100 may detect that the electronic device 160 is disposed at a second position $(x_2, y_2, z_2)$. The wireless power transmission device 100 may control the patch antennas 111 to 126 such that the sub power signals act as constructive interference at the second position $(x_2, y_2, z_2)$ in order to charge the electronic device 160. Accordingly, a power signal 131 formed by the sub power signals may have the maximum amplitude at the second position $(x_2, y_2, z_2)$ and thus the electronic device 160 may receive wireless power with high transmission efficiency.

More specifically, the electronic devices 150 and 160 may be disposed relatively on the right side. In this case, the wireless power transmission device 100 may apply a relatively larger delay to sub power signals formed from patch antennas (for example, 114, 118, 122, and 126) disposed relatively on the right side. That is, after sub power signals formed from patch antennas (for example, 111, 115, 119, and 123) disposed relatively on the left side are formed, the sub power signals may be generated from the antenna patches (for example, 114, 118, 122, and 126) disposed relatively on the right side after a predetermined time. Accordingly, sub power signals may meet at the same time at relatively right positions, and that is, the sub power signals may act as constructive interference at the relatively right positions. If beamforming is performed at a relatively central position, the wireless power transmission device 100 may apply actually the same delay to the left patch antennas (for example, 111, 115, 119, and 123) and the right patch antennas (for example, 114, 118, 122, and 126). Further, if beamforming is performed at a relatively left position, the wireless power transmission device 100 may apply a larger delay to the left patch antennas (for example, 111, 115, 119, and 123) than to the right patch antennas (for example, 114, 118, 122, and 126). Meanwhile, according to another embodiment, the wireless power transmission device 100 may oscillate the sub power signals on all of the patch antennas 111 to 126 actually at the same time and perform beamforming by controlling the phase corresponding to the delay.

As described above, the wireless power transmission device 100 may determine locations of the electronic devices 150 and 160 and make the sub power signals act as constructive interference at the determined locations, so as to perform wireless charging with high transmission efficiency. Meanwhile, the wireless power transmission device 100 may perform wireless charging with high transmission efficiency by accurately detecting the locations of the electronic devices 150 and 160.

Figure 2A:
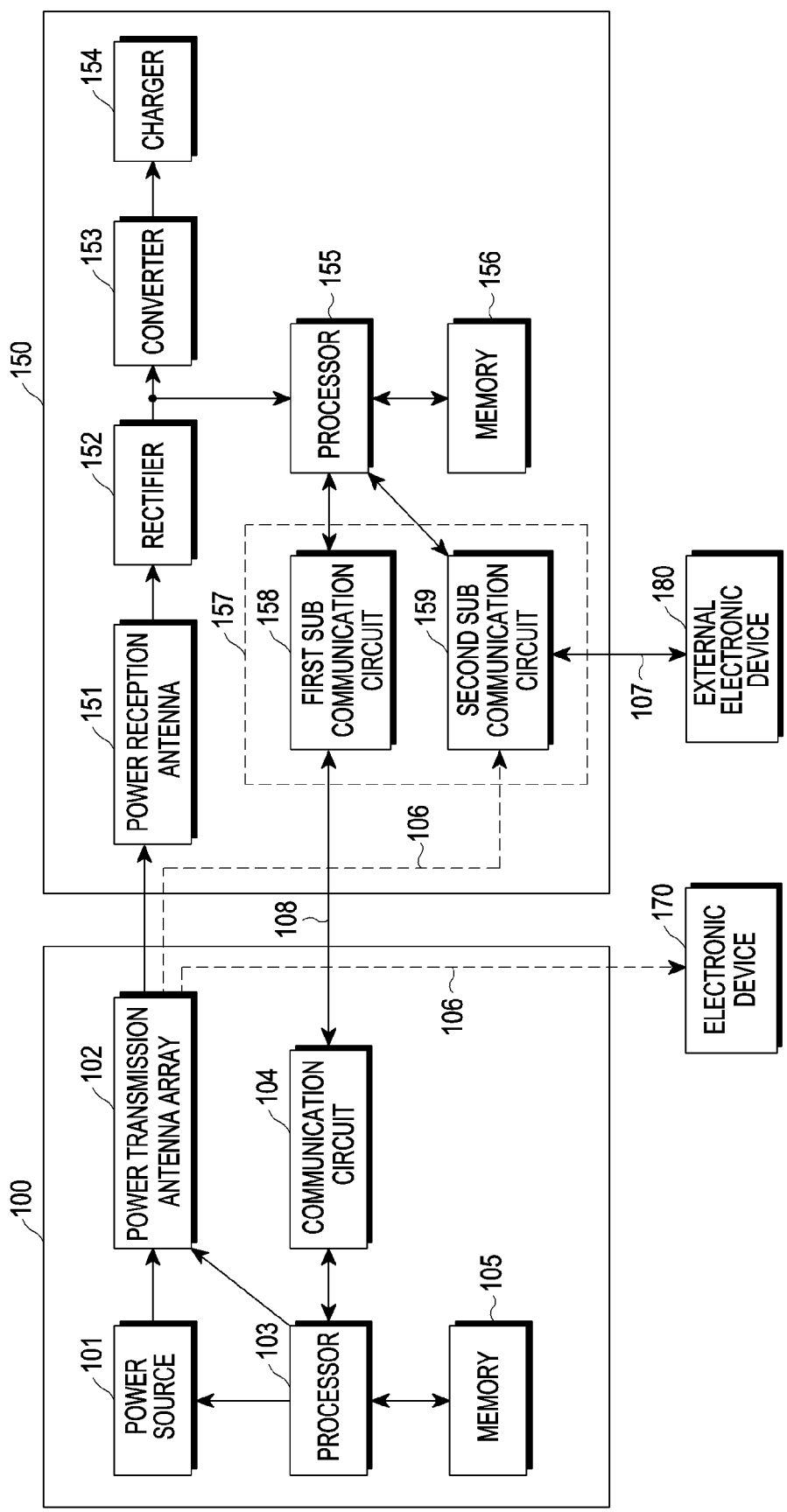
FIG. 2A is a block diagram illustrating a wireless power transmission device and an electronic device according to various embodiments of the disclosure.

FIG. 2A is a block diagram illustrating a wireless power transmission device and an electronic device according to various embodiments of the disclosure.

Figure 2B:
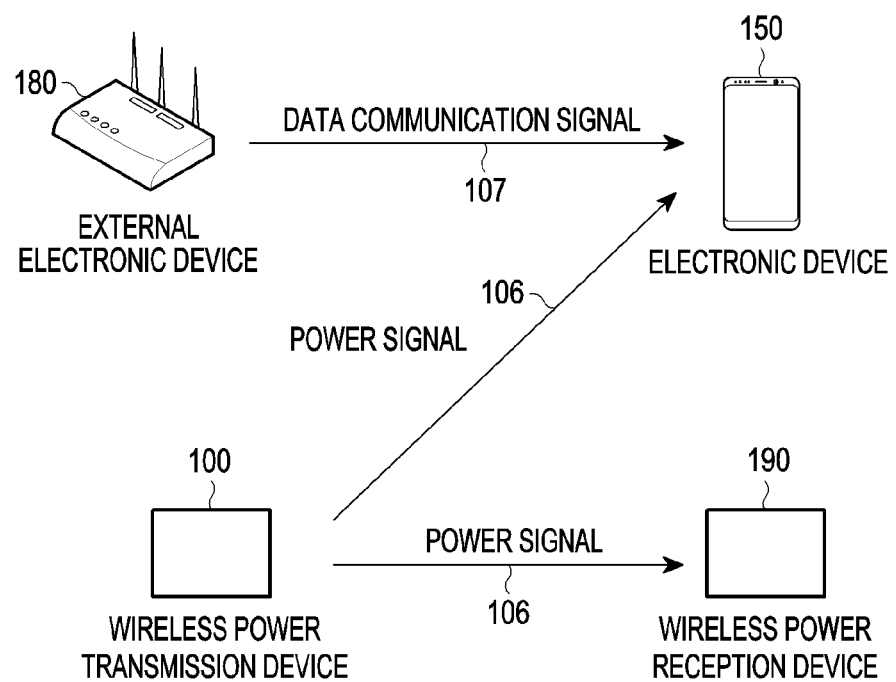
FIG. 2B illustrates that a communication signal, which an electronic device receives from an external electronic device, has an interference effect due to a power signal, which a wireless power transmission device transmits to a wireless power reception device, according to various embodiments of the disclosure.

FIG. 2B illustrates that a communication signal, which an electronic device receives from an external electronic device, has an interference effect due to a power signal, which a wireless power transmission device transmits to a wireless power reception device, according to various embodiments of the disclosure.

Hereinafter, various embodiments of the disclosure will be described with reference to FIGS. 2A and 2B. The embodiments of FIG. 2A are described in more detail with reference to FIG. 2B.

Referring to FIG. 2A, the wireless power transmission device 100 may include a power source 101, a power transmission antenna array 102, a processor 103, a communication circuit 104, and a memory 105. Referring to FIG. 2A, any device capable of wirelessly receiving power can be the electronic device 150 or 160, and the electronic device 150 or 160 may include a power reception antenna 151, a rectifier 152, a converter 153, a charger 154, a processor 155, a memory 156, and a communication circuit 157.

The power source 101 may provide power to be transmitted to the power transmission antenna array 102. The power source 101 may provide, for example, direct current power. In this instance, the wireless power transmission device 100 may further include an inverter (not shown) which converts direct current power into alternating current power and transfers the same to the power transmission antenna array 102. Meanwhile, according to another embodiment, the power source 101 may provide alternating current power to the power transmission antenna array 102.

The power transmission antenna array 102 may include a plurality of patch antennas. For example, the plurality of patch antennas 111 to 126 illustrated in FIG. 1 may be included in the power transmission antenna array 102. There is no limit to the number of the plurality of patch antennas or arrangement form thereof. The power transmission antenna array 102 may form a power signal (RF wave) using power received from the power source 101. The power transmission antenna array 102 may form a power signal in a specific direction under the control of the processor 103. Forming the power signal in the specific direction may mean that at least one of the amplitude and the phase of sub power signals is controlled to make sub power signals at one position in the specific direction cause constructive interference.

The processor 103 may control the power transmission antenna array 102 to form a sub power signal in each of a plurality of directions. The memory 130 may store a program or an algorithm to generate a sub power signal, that is, a pilot signal in each of a plurality of directions. The processor 103 may control at least one of the phase and the amplitude of each patch antenna of the power transmission antenna array 610 using the program or algorithm stored in the memory 130.

The processor 103 may determine directions in which the electronic devices 150 and 160 are located and determine directions in which power signals are formed on the basis of the determined directions. That is, the processor 103 may control patch antennas of the power transmission antenna array 102 for generating sub power signals to make the sub power signals cause constructive interference at one position of the determined direction. For example, the processor 103 may control at least one of the amplitude and the phase of the sub power signal generated from each of the patch antennas by controlling the patch antennas or a control means connected to the patch antennas.

The processor 103 may form a power signal 106 of the electronic devices 150 and 160 by controlling the power transmission antenna array 102 on the basis of the directions of the electronic devices 150 and 160. For example, as illustrated in FIG. 2B, the wireless power transmission device 100 may form the power signal 106 in the direction of the wireless power reception device 190 (for example, the electronic device 160 of FIG. 2A). Meanwhile, the processor 103 may identify the electronic devices 150 and 160 on the basis of information within a communication signal 108. The communication signal 108 may include a unique identifier or a unique address of the electronic device. The communication circuit 104 may process the communication signal 108 and may provide information to the processor 103. The communication circuit 104 and a communication antenna (not shown) may be manufactured on the basis of various communication schemes, such as Wi-Fi, Bluetooth, Zig-bee, Near Field Communication (NFC), Bluetooth Low Energy (BLE), and the like, and the type of communication scheme is not limited. Meanwhile, the communication signal 108 may include rated power information of the electronic devices 150 and 160, and the processor 103 may determine whether to charge the electronic devices 150 and 160 on the basis of at least one of unique identifiers, unique addresses, and rated power information of the electronic devices 150 and 160.

Further, the communication signal 108 may be used by the wireless power transmission device 100 for a process of identifying the electronic devices 150 and 160, a process of allowing power transmission to the electronic devices 150 and 160, a process of making a request for reception power-related information to the electronic devices 150 and 160, and a process of receiving reception power-related information from the electronic devices 150 and 160. That is, the communication signal 108 may be used for a subscription, command, or request process between the wireless power transmission device 100 and the electronic devices 150 and 160.

Meanwhile, the processor 103 may control the power transmission antenna array 102 to form the power signal 106 in the determined directions of the electronic devices 150 and 160. The processor 103 may form a power signal for detection and determine distances to the electronic devices 150 and 160 on the basis of another communication signal received later as feedback. For example, the other communication signal may include a time stamp at a transmission time point. The processor 103 may determine the distances to the electronic devices 150 and 160 by comparing the time stamp included in the other communication signal with a reception time point.

Accordingly, the processor 103 may determine all of the directions of the electronic devices 150 and 160 and the distances to the electronic devices 150 and 160, and as a result, determine the locations of the electronic devices 150 and 160. The processor 103 may control patch antennas to make sub power signals generated by the patch antennas at the locations of the electronic devices 150 and 160 act as constructive interference. Accordingly, the power signal 106 may be transmitted to the power reception antenna 151 with relatively high transmission efficiency.

Any antenna capable of receiving a power signal can be the power reception antenna 151. In addition, the power reception antenna 151 may be embodied in an array form including a plurality of antennas. Alternating current power received by the power reception antenna 151 may be rectified into DC power by the rectifier 152. The converter 153 may convert the direct current power into a desired voltage, and provide the same to the charger 154. The charger 154 may charge a battery (not shown). Meanwhile, although not illustrated, the converter 153 may provide converted power to a Power Management Integrated Circuit (PMIC) (not shown), and the PMIC (not shown) may provide power to various hardware elements of the electronic devices 150 and 160.

The communication circuit 157 may support establishment of a communication channel between the electronic devices 150 and 160 and the external electronic device 180 or between the electronic devices 150 and 160 and the wireless power transmission device 100 and communication through the established communication channel. The communication circuit 157 may perform data communication for transmitting and receiving the communication signal 107 to and from the external electronic device 180. For example, as illustrated in FIG. 2B, the electronic device 150 may receive the data communication signal 107 from the external electronic device 180 through the communication circuit 157. When the wireless power transmission device 100 forms the power signal 106 to another electronic device 160 while the electronic device 150 receives the data communication signal 107 from the external electronic device 180, the data communication signal 107 may include an interference signal caused by the power signal 106. For example, as illustrated in FIG. 2B, the data communication signal 107, which the electronic device 150 receives from the external electronic device 180, may include an interference signal caused by the power signal 106 formed in the wireless power reception device 190 by the wireless power transmission device 100. The communication circuit 157 may operate independently from the processor 155 and include one or more communication processors supporting direct (for example, wired) or wireless communication. The communication circuit 157 according to various embodiments may include a wireless communication circuit (for example, Wi-Fi or a Bluetooth communication module) using a preset frequency band (for example, 2.4 Ghz, 5 Ghz, or 5.8 Ghz) corresponding to a frequency band of the power signal 106. When the frequency of the power signal 106 is similar to or at least partially the same as the frequency of the wireless communication circuit, interference may be generated between the power signal 106 and the communication signal 108. The communication circuit 157 may receive information related to the power signal 106 (for example, information on a complex number specifying the power signal and information on a transmission intensity of the power signal) from the wireless power transmission device 100 and estimate information on a channel with the wireless power transmission device 100. The communication circuit 157 may receive a beacon signal 108 including information related to the power signal 106 from the wireless power transmission device 100 and estimate information on the channel with the wireless power transmission device 100 on the basis of the beacon signal 108. The communication circuit 157 may remove the interference signal caused by the power signal 106 from the data communication signal 107 before decoding the data communication signal 107 on the basis of the information related to the power signal 106 and the information on the channel A detailed operation of removing the interference signal from the data communication signal 107 will be described below in detail with reference to FIGS. 4 to 8.

The communication circuit 157 according to various embodiments may operate while being divided into a first sub communication circuit 158 and a second sub communication circuit 159. According to an embodiment, the first sub communication circuit 158 may include a wireless communication circuit (for example, a cellular communication module, a short-range wireless communication module, a Global Navigation Satellite System (GNSS) communication module, LTE, LTE-A, CDMA, WCDMA, UMTS, WiBro, GSM, Wi-Fi, Bluetooth, and a Infrared Data Association (IrDA) communication module) using a preset first frequency band (for example, a frequency band lower than 10 Ghz). The electronic devices 150 and 160 may receive information related to the power signal 106 (for example, information on a complex number specifying the power signal and information on a transmission intensity of the power signal) from the wireless power transmission device 100 through the first sub communication circuit 158 and estimate information on a channel with the wireless power transmission device 100. The electronic devices 150 and 160 may receive the beacon signal 108 including information related to the power signal 106 from the wireless power transmission device 100 through the first sub communication circuit 158 and estimate information on the channel on the basis of the beacon signal 108. According to an embodiment, the second sub communication circuit 159 may use a frequency band corresponding to the frequency band of the power signal 106 and include a wireless communication circuit (for example, a Wigig communication module and a 5G communication module based on a millimeter wave (mmWave)) using a preset second frequency band (for example, a frequency band higher than or equal to 10 Ghz) higher than the first frequency band used by the first sub communication circuit 158. The electronic devices 150 and 160 may perform data communication for transmitting and receiving the data communication signal 107 to and from the external electronic device 180 through the second sub communication circuit 159. If the frequency of the power signal 106 transmitted from the power transmission antenna array 102 is higher than or equal to, for example, 10 Ghz, interference may be generated between the frequency of the power signal 106 and the data communication signal 107. The first sub communication circuit 158 of the electronic devices 150 and 160 may receive information related to the power signal 106 and estimate information on a channel, and the second sub communication circuit 159 of the electronic devices 150 and 160 may remove an interference signal caused by the power signal 106 from the data communication signal 107 before decoding the data communication signal 107 on the basis of the information related to the power signal 106 and the information on the channel. A detailed operation of removing the interference signal from the data communication signal 107 will be described below in detail with reference to FIGS. 4 to 8. The example of separating the first sub communication circuit 158 and the second sub communication circuit 159 is only an embodiment, but the disclosure is not limited thereto, and an example of a communication circuit using a wireless signal known by those skilled in the art may be included.

The communication circuit 157 may transmit the communication signal 108 including identification information of the electronic devices 150 and 160 to the wireless power transmission device 100. The memory 156 may store a program or an algorithm for controlling various hardware elements of the electronic devices 150 and 160.

The processor 155 may monitor a voltage of an output end of the rectifier 152. For example, a voltmeter connected to the output end of the rectifier 152 may be further included in the electronic devices 150 and 160, and the processor 155 may receive a voltage value from the voltmeter and monitor the voltage of the output end of the rectifier 152. The processor 155 may provide information including the voltage value of the output end of the rectifier 152 to the communication circuit 157. The communication circuit 157 may transmit the communication signal 108 including information related to reception power through a communication antenna (not shown). Information on the reception power may be, for example, information related to the size of received power such as the voltage of the output end of the rectifier 152, and may include a size value of a current of the output end of the rectifier 152. In this case, it may be easily understood by those skilled in the art that an ammeter for measuring the current of the output end of the rectifier 152 or the voltmeter may be further included in the electronic devices 150 and 160. The ammeter may be embodied in various forms, such as a DC ammeter, an AC ammeter, a digital ammeter, or the like, and the type of ammeter may not be limited. The voltmeter may be embodied in various forms, such as an electro dynamic instrument voltmeter, a static electricity type voltmeter, a digital voltmeter, or the like, and the type of voltmeter may not be limited. Further, not only the output end of the rectifier 152 but also any position of the electronic devices 150 and 160 may be the location at which the information related to the reception power is measured.

Figure 3A:
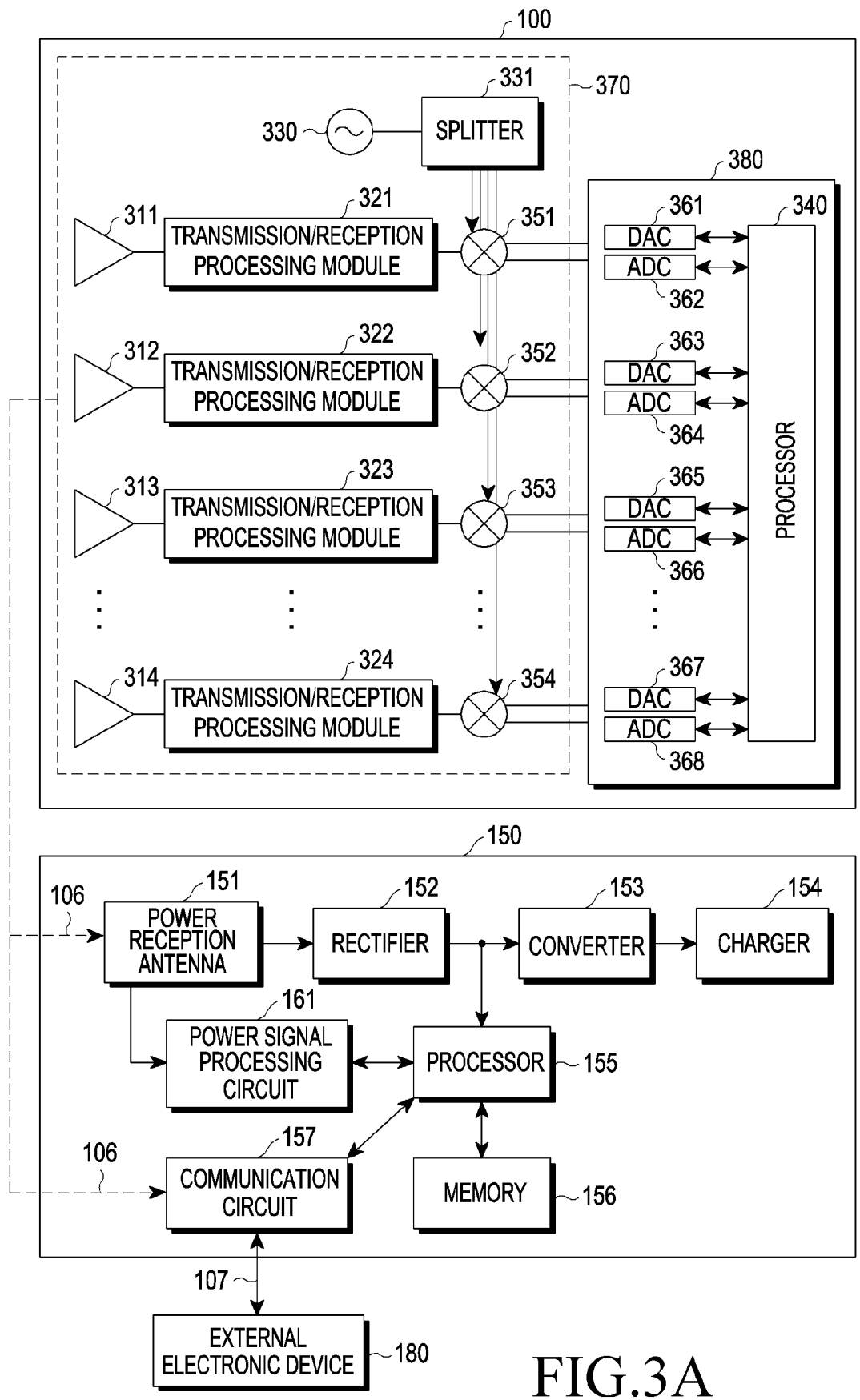
FIG. 3A is a conceptual diagram illustrating a modification example of the configuration of a wireless power transmission device and the configuration of an electronic device according to various embodiments of the disclosure.

FIG. 3A is a conceptual diagram illustrating a modification example of the configuration of a wireless power transmission device and the configuration of an electronic device according to various embodiments of the disclosure.

Figure 3B:
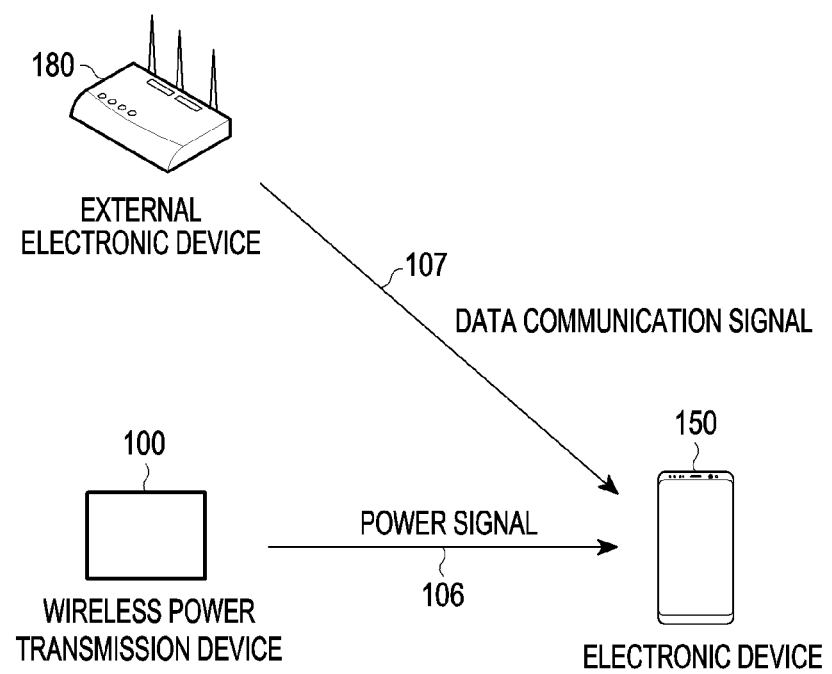
FIG. 3B illustrates that an interference effect by a power signal, which the wireless power transmission device transmits to the electronic device, is generated in a data communication signal, which the electronic device receives from the external electronic device according to various embodiments of the disclosure.

FIG. 3B illustrates that an interference effect by a power signal, which the wireless power transmission device transmits to the electronic device, is generated in a data communication signal, which the electronic device receives from the external electronic device according to various embodiments of the disclosure. Hereinafter, various embodiments of the disclosure will be described with reference to FIGS. 3A and 3B. The embodiments of FIG. 3A are described in more detail with reference to FIG. 3B.

Referring to FIG. 3A, the wireless power transmission device 100 may include a transmitter 270 and a processor 380. Any device capable of wirelessly receiving power can be the electronic device 150, and the electronic device 150 may include a power reception antenna 151, a rectifier 152, a converter 153, a charger 154, a processor 155, a memory 156, a communication circuit 157, and a power signal processing circuit 161.

The transmitter 370 may include patch antennas 311 to 314, an oscillator 330, transmission/reception processing modules 321 to 324, and mixers 351 to 354, and the processor 380 of the wireless power transmission device 100 may include a processor 340, a Digital-to-Analog Converters (DACs) 361, 363, 365, and 367, and Analog-to-Digital Converters (ADCs) 362, 364, 366, and 368.

The oscillator 330 may provide signals of an AC waveform to a splitter 231. The splitter 331 may split the received signals into signals corresponding to the number of patch antennas 311 to 314. The splitter 331 may transfer the split signals to the respective mixers 351 to 354. The signals from the splitter 331 may be provided to the respective transmission/reception processing modules 321 to 324 through the respective mixers 351 to 354.

The transmission/reception processing modules 321 to 324 may process the received signals and provide the same to the respective antennas 311 to 314. According to various embodiments of the disclosure, the transmission/reception processing modules 321 to 324 may control the phase of the received signals, that is, may apply the delay for the signals. Alternatively, the transmission/reception processing modules 321 to 324 may control the amplitude of the received signals. Each of the transmission/reception processing modules 321 to 324 may control at least one of the phase and the amplitude of the signals under the control of the processor 340, and the processor 340 may control each of the transmission/reception processing modules 321 to 324 to control at least one of the phase and the amplitude of the signals such that the signals are beamformed at a specific position. More specifically, the degree of the phase controlled by the transmission/reception processing modules 321 to 324 may be different, and accordingly time points at which sub power signals oscillate at the respective patch antennas 311 to 314 may be different and beamforming at a specific position or in a specific direction may be performed.

Meanwhile, the processor 340 may further provide additional information (for example, information related to the power signal 106 including information on a complex number specifying the power signal 106 and information on a transmission intensity of the power signal 106), and the additional information may be mixed with the signals from the splitter 331 through the respective mixers 351 to 354. The additional information may be converted into the analog form by the Digital-to-Analog Converters (DACs) 361, 363, 365, and 367 and provided to the respective mixer 351 to 354. The mixers 351 to 354 may modulate the signal from the oscillator 330 and output the same to the transmission/reception processing modules 321 to 324. Alternatively, the mixers 351 to 354 may convert the signals output from the transmission/reception processing modules 321 to 324 into information through the Analog-to-Digital Converters (ADCs) 362, 364, 366, and 368 and output the information to the processor 340.

The patch antennas 311 to 314 may correspond to the patch antennas 111 to 126, respectively. The patch antennas 311 to 314 may form sub power signals using the signals received from the respective transmission/reception processing modules 321 to 324. The power signal 106 interfered by the sub power signals may be oscillated from the patch antennas 311 to 314. The power signal 106 may oscillate for a first period. That is, the oscillator 330 may provide power to the splitter 331 for the first period and process the signals received by the respective transmission/reception processing modules 321 to 324 to form the power signal 106, and the patch antennas 311 to 314 may form sub power signals using the received signals. For example, as illustrated in FIG. 3B, the wireless power transmission device 100 may form the power signal 106 in the direction of the electronic device 150. The formation of the sub power signals by the patch antennas 311 to 314 using the signals received for the first period is named a transmission mode.

Accordingly, the wireless power transmission device 100 implemented above may insert predetermined information, for example, at least one piece of the information related to the power signal or the channel information into the sub power signals and transmit the sub power signals without further include a separate communication circuit.

Any antenna capable of receiving the power signal 106 formed by the wireless power transmission device 100 can be the power reception antenna 151. In addition, the power reception antenna 151 may be embodied in an array form including a plurality of antennas. Alternating current power received by the power reception antenna 151 may be rectified into DC power by the rectifier 152. The converter 153 may convert the direct current power into a desired voltage, and provide the same to the charger 154. The charger 154 may charge a battery (not shown). Meanwhile, although not illustrated, the converter 153 may provide converted power to a Power Management Integrated Circuit (PMIC) (not shown), and the PMIC (not shown) may provide power to various hardware elements of the electronic device 150.

The power signal processing circuit 161 may process information (for example, information related to the power signal 106) included in the power signal 106 received through the power reception antenna 151 and information on a channel with the wireless power transmission device 100, estimated by the power reception antenna 151 and provide the processed information to the processor 155. The information related to the power signal 106 may include at least one piece of the information related to the complex number specifying the power signal 106 and the information related to the transmission intensity of the power signal 106, and the information related to the channel with the wireless power transmission device 100 may include at least one piece of the information on the gain of the channel and a phase of the channel.

The communication circuit 157 may perform data communication for transmitting and receiving the data communication signal 107 between the electronic device 150 and the external electronic device 180. For example, as illustrated in FIG. 3B, the electronic device 150 may receive the data communication signal 107 from the external electronic device 180 through the communication circuit 157. When the electronic device 150 receives the power signal 106 from the wireless power transmission device 100 while receiving the data communication signal from the external electronic device 180, an interference signal caused by the power signal 106 may be included in the data communication signal 107. For example, as illustrated in FIG. 3B, the data communication signal 107, which the electronic device 150 receives from the external electronic device 180, may include the interference signal caused by the power signal 106, formed in the electronic device 150 by the wireless power transmission device 100.

The communication circuit 157 may remove the interference signal caused by the power signal 106 from the data communication signal 107 before decoding the data communication signal 107 on the basis of the received information related to the power signal 106 and estimated information on the channel. A detailed operation of removing the interference signal from the data communication signal 107 will be described below in detail with reference to FIGS. 4 to 8.

According to various embodiments, the electronic device 150 receives the power signal 106 from the wireless power transmission device 100 and thus may be named a wireless power reception device for convenience of description.

According to various embodiments, a plurality of patch antennas of the wireless power transmission device 100 may be implemented according to various arrangements, forms, and antenna types as described above and thus may be named antennas having the inclusive meaning. That is, among N patch antennas of the wireless power transmission device, a first patch antenna may referred to as a first antenna, a second patch antenna may be referred to as a second antenna, and an $N^{th}$ patch antenna may be referred to as an $N^{th}$ antenna.

Figure 4:
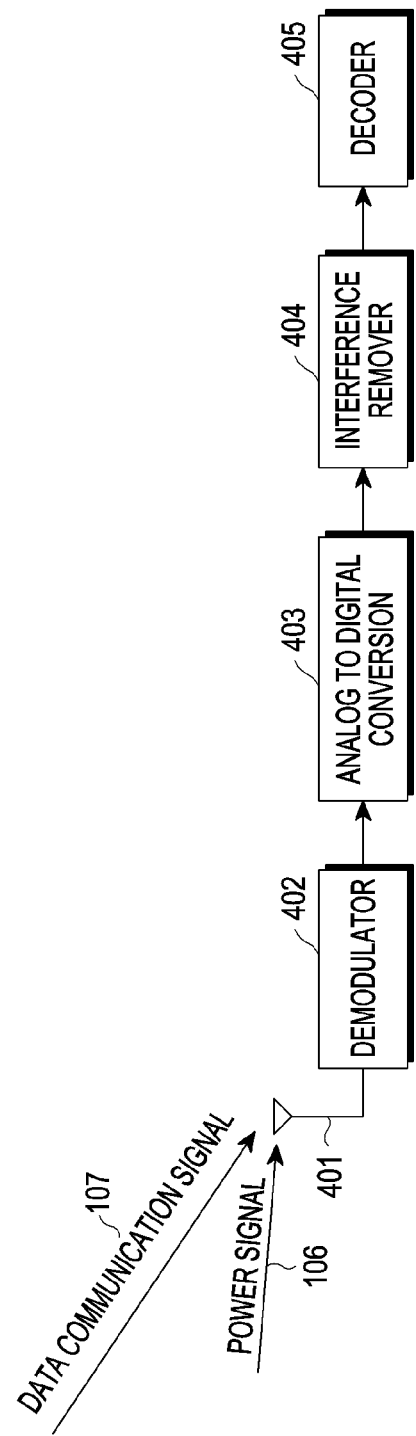
FIG. 4 is a block diagram illustrating a communication circuit of an electronic device according to various embodiments of the disclosure.

FIG. 4 is a block diagram illustrating a communication circuit of an electronic device according to various embodiments of the disclosure.

Referring to FIG. 4, the communication circuit 157 or the second communication circuit 159 of the electronic device 150 may include an antenna 401, a demodulator 402, an Analog-to-Digital Converter (ADC) 403, an interference remover 404, and a decoder 405.

The antenna 401 may receive the data communication signal 107 from another electronic device. The data communication signal 107 may include an interference signal caused by the power signal 107 generated from the wireless power transmission device 100. The demodulator 402 may demodulate the data communication signal 107, which is a signal in a radio frequency band (a Radio Frequency (RF) signal) or a signal in an intermediate frequency band (an Intermediate Frequency (IF) signal), received through the antenna 401 to a baseband signal. The ADC 403 may convert the data communication signal 107 demodulated to the baseband signal into the form of a digital signal.

The interference remover 404 may remove the interference signal caused by the power signal 106 from the data communication signal 107 on the basis of the information on the channel between the wireless power transmission device 100 and the electronic device 150 and the information related to the power signal 106. The interference remover 404 may remove a digital signal corresponding to the interference signal from the data communication signal 107 in the digital form.

The electronic device 150 according to various embodiments may acquire in advance the information on the channel between the wireless power transmission device 100 and the electronic device 150 and the information related to the power signal 106 from the wireless power transmission device 100. The information on the channel and the information related to the power signal 106 may be included in the beacon signal 108 from the wireless power transmission device 100. The information on the channel between the wireless power transmission device 100 and the electronic device 150 may include at least one of the gain of the channel and the phase of the channel, and the information related to the power signal 106 may include at least one piece of the information on the complex number specifying the power signal 106 or the information on the transmission intensity of the power signal 106.

The interference remover 404 may calculate a digital signal corresponding to the interference signal on the basis of an equation of $g^* \sqrt{P_T}^* s[k]$. In the equation, g denotes information on the channel, $\sqrt{P_T}$ denotes information on the transmission intensity of the power signal 106, and s [k] denotes information on the complex number specifying the power signal 106. The interference remover 404 may identify that the form of the digital signal of the data communication signal 107 output from the ADC 403 is y[k] and subtract the form of the digital signal of $g*\sqrt{P_T}*s[k]$ corresponding to the interference signal from y[k]. The interference remover 404 may remove the digital signal (for example, $g*\sqrt{P_T}*s[k]$) corresponding to the interference signal from the data communication signal 107 (for example, y[k]) which is the form of the digital signal on the basis of the equation of $y[k]-g*\sqrt{P_T}*s[k]$. The interference remover 404 may input the signal obtained by removing the interference signal from the data communication signal 107 into the decoder 405.

The decoder 405 may decode the signal obtained by removing the digital signal corresponding to the interference signal from the digital signal corresponding to the data communication signal 107. The decoder 405 may provide the decoded signal to the processor 155.

Figure 5:
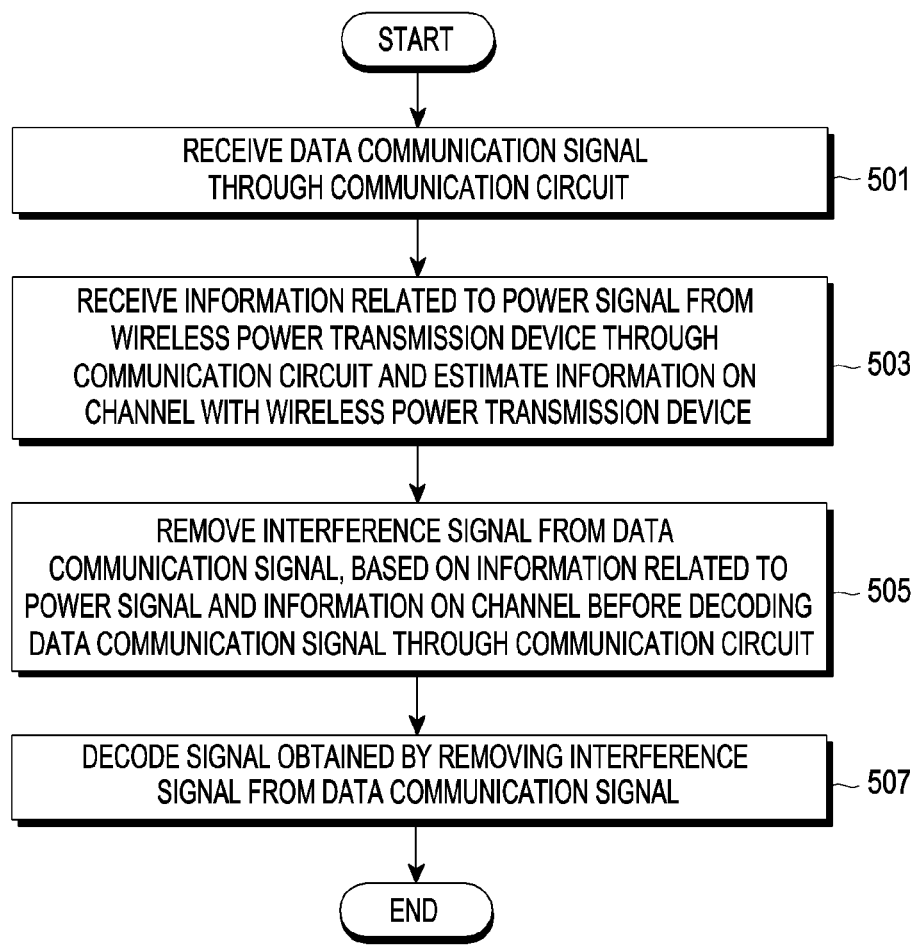
FIG. 5 is a flowchart illustrating a method by which an electronic device removes an interference signal caused by a power signal from a data communication signal while a wireless power transmission device forms a power signal and transmits the same to a wireless power reception device according to various embodiments of the disclosure.

FIG. 5 is a flowchart illustrating a method by which an electronic device removes an interference signal caused by a power signal from a data communication signal while a wireless power transmission device forms the power signal and transmits the same to a wireless power reception device according to various embodiments of the disclosure.

Figure 6:
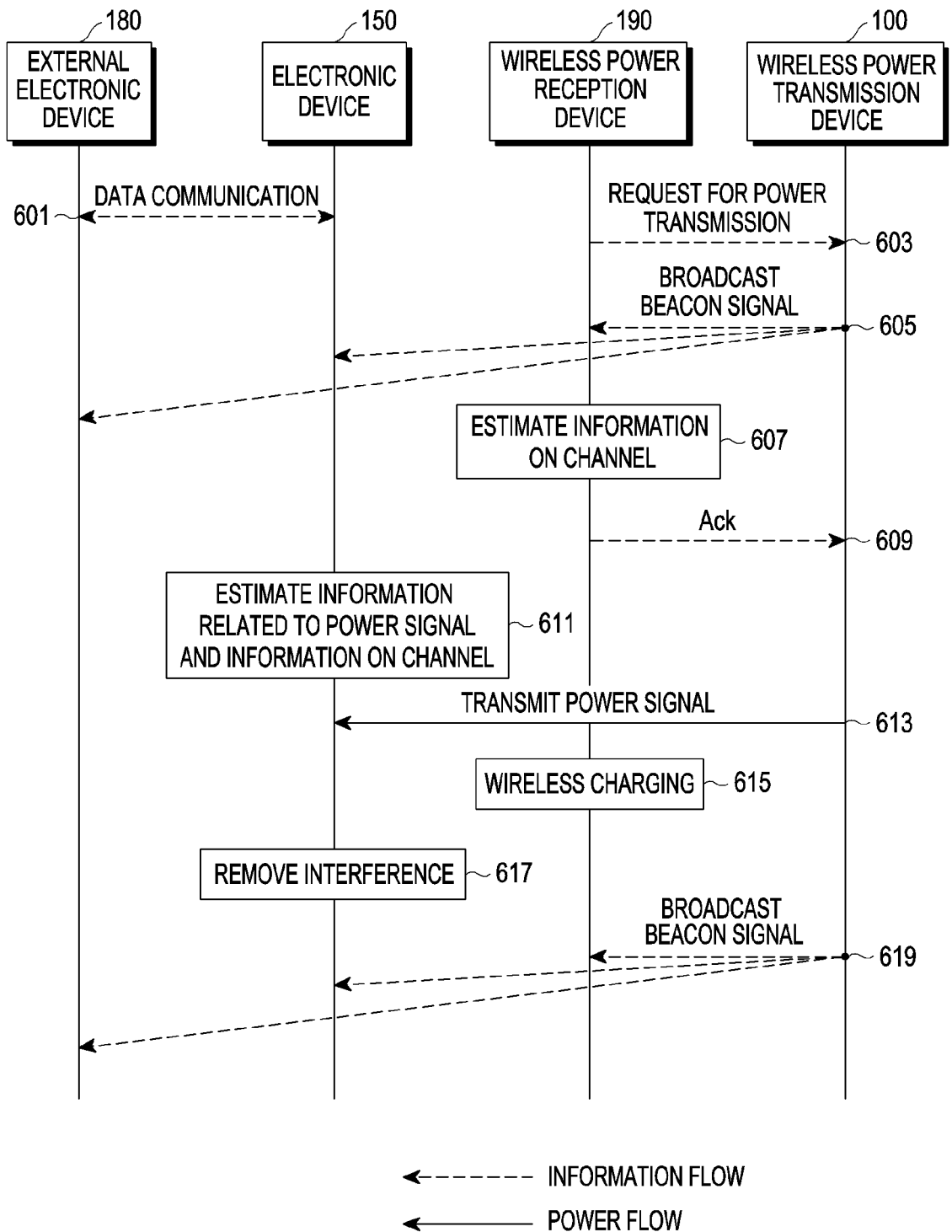
FIG. 6 illustrates an embodiment in which the electronic device removes the interference signal caused by the power signal from the data communication signal while the wireless power transmission device forms the power signal and transmits the same to the power reception device according to various embodiments of the disclosure.

FIG. 6 illustrates an embodiment in which the electronic device removes the interference signal caused by the power signal from the data communication signal while the wireless power transmission device forms the power signal and transmits the same to the power reception device according to various embodiments of the disclosure.

Hereinafter, various embodiments of the disclosure will be described with reference to FIGS. 5 and 6. The embodiments of FIG. 5 are described in more detail with reference to FIG. 6.

Referring to FIG. 5, according to various embodiments, the electronic device 150 (for example, the processor 155 or a processor of the communication circuit 157 of FIG. 1) may perform data communication for transmitting and receiving the communication signal 107 to and from the external electronic device 180 through the communication circuit 157 or the second sub communication circuit 159 in operation 501. For example, as illustrated in FIG. 6, the electronic device 150 may perform data communication 601 for transmitting and receiving the data communication signal 107 to and from the external electronic device 180. The electronic device 150 may demodulate the data communication signal which is a signal in a radio frequency band (Radio Frequency (RF) signal) or a signal in an intermediate frequency band (an Intermediate Frequency (IF) signal) to a baseband signal through the communication circuit 157 or the second sub communication circuit 159, convert the data communication signal 107 demodulated to the baseband signal into the form of a digital signal, and decode the digital signal.

According to various embodiments, the electronic device 150 (for example, the processor 155 or a processor of the communication circuit 157 of FIG. 1) may receive information related to the power signal 106 from the wireless power transmission device 100 through one of the communication circuit 157, the first sub communication circuit 158, or the power reception antenna 151 and estimate information on a channel with the wireless power transmission device 100 in operation 503. The electronic device 150 may receive the beacon signal 108 including information related to the power signal 106 from the wireless power transmission device 100 and estimate information on the channel with the wireless power transmission device 100 on the basis of the beacon signal 108. For example, as illustrated in FIG. 6, as the wireless power transmission device 100 receives a signal requesting for transmitting power from the wireless power reception device 190 in operation 603, the wireless power transmission device 100 may broadcast the beacon signal to the wireless power reception device 190, the electronic device 150, and the external electronic device 180 in operation 605. As the wireless power reception device 190 transmits the signal requesting for transmitting power to the wireless power transmission device 100 in operation 603, the electronic device 150 may receive the beacon signal from the wireless power transmission device 100. In another example, as illustrated in FIG. 6, the wireless power transmission device 100 may broadcast the beacon signal to the wireless power reception device 190, the electronic device 150, and the external electronic device 180 at preset time intervals in operation 619, and accordingly, the electronic device 150 may receive the beacon signal at preset time intervals.

According to various embodiments, the electronic device 150 may identify information related to the power signal 106 included in the beacon signal 108 received from the wireless power transmission device 100 and estimate information on a channel with the wireless power transmission device 100 on the basis of the beacon signal 108. For example, as illustrated in FIG. 6, the electronic device 150 may identify information related to the power signal 106 including at least one piece of information on a complex number specifying the power signal 106 or information on a transmission intensity of the power signal 106 from the beacon signal, and may estimate information on the channel including at least one piece of information on the gain of the channel and the phase of the channel in operation 611. Meanwhile, referring to FIG. 6, the wireless power reception device 190 may receive the broadcasted beacon signal from the wireless power transmission device 100 and estimate information on a channel between the wireless power transmission device 100 and the wireless power reception device 190 on the basis of the beacon signal in operation 607. After estimating the information on the channel between the wireless power transmission device 100 and the wireless power reception device 190 in operation 607, the wireless power reception device 190 may transmit Ack including a channel feedback to the wireless power transmission device 100 in operation 609. In response to reception of the Ack from the wireless power reception device 190, the wireless power transmission device 100 may form the power signal 106 in a direction of the wireless power reception device 190 in operation 613. The wireless power reception device 190 may charge power on the basis of the power signal 106 received from the wireless power transmission device 100 in operation 615. In this case, an interference signal caused by the power signal 106 formed by the wireless power transmission device 100 may be generated in the data communication signal 107 between the electronic device 150 and the external electronic device 180.

According to various embodiments, before decoding the data communication signal 107 through the communication circuit 157 or the second sub communication circuit 159, the electronic device 150 (for example, the processor 155 or the processor of the communication circuit 157 of FIG. 1) may remove the interference signal from the data communication signal 107 on the basis of information related to the power signal 106 and information on the channel with the wireless power transmission device 100 in operation 505. The electronic device 150, according to various embodiments, may calculate a digital signal corresponding to the interference signal using the equation of $g*\sqrt{P_T}*s[k]$. In the equation, g denotes information on the channel, $\sqrt{P_T}$ denotes information on the transmission intensity of the power signal 106, and s[k] denotes information on the complex number specifying the power signal 106. The electronic device 150 may identify that the form of the digital signal of the data communication signal 107 is y[k] and subtract the form of the digital signal of $g^*\sqrt{P_T}^*s[k]$ corresponding to the interference signal from y[k]. For example, the electronic device 150 may remove the digital signal (for example, $g^*\sqrt{P_T}^*s[k]$) corresponding to the interference signal from the data communication signal 107 (for example, y[k]) which is form of the digital signal on the basis of the equation of $y[k]-g^*\sqrt{P_T}^*s[k]$. The electronic device 150 according to various embodiments may receive a beacon signal including information related to the power signal 106 and information on a channel at preset time intervals and identify the same, and when the information related to the power signal 106 and the information on the channel are changed, remove the changed interference signal from the data communication signal 107 on the basis of the changed information on the power signal 106 and the changed information on the channel before decoding the data communication signal 107 through the communication circuit 157 or the second sub communication circuit 159.

According to various embodiments, the electronic device 150 (for example, the processor 155 or the processor of the communication circuit 157 of FIG. 1) may decode a signal obtained by removing the digital signal corresponding to the interference signal from the digital signal corresponding to the data communication signal 107 through the communication circuit 157 or the second sub communication circuit 159 in operation 507.

Figure 7:
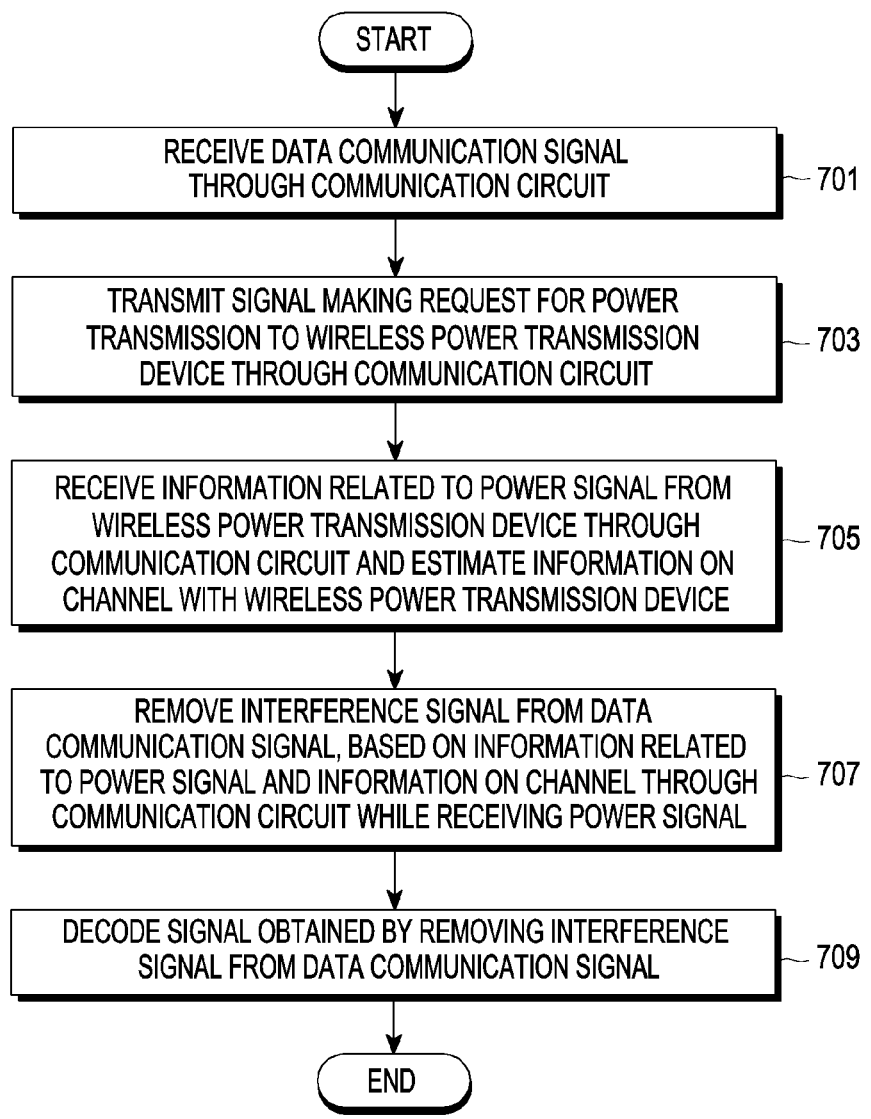
FIG. 7 is a flowchart illustrating a method by which an electronic device removes an interference signal caused by a power signal from a data communication signal while the electronic device receives the power signal from a wireless power transmission device according to various embodiments of the disclosure.

FIG. 7 is a flowchart illustrating a method by which an electronic device removes an interference signal caused by a power signal from a data communication signal while the electronic device receives the power signal from a wireless power transmission device according to various embodiments of the disclosure.

Figure 8:
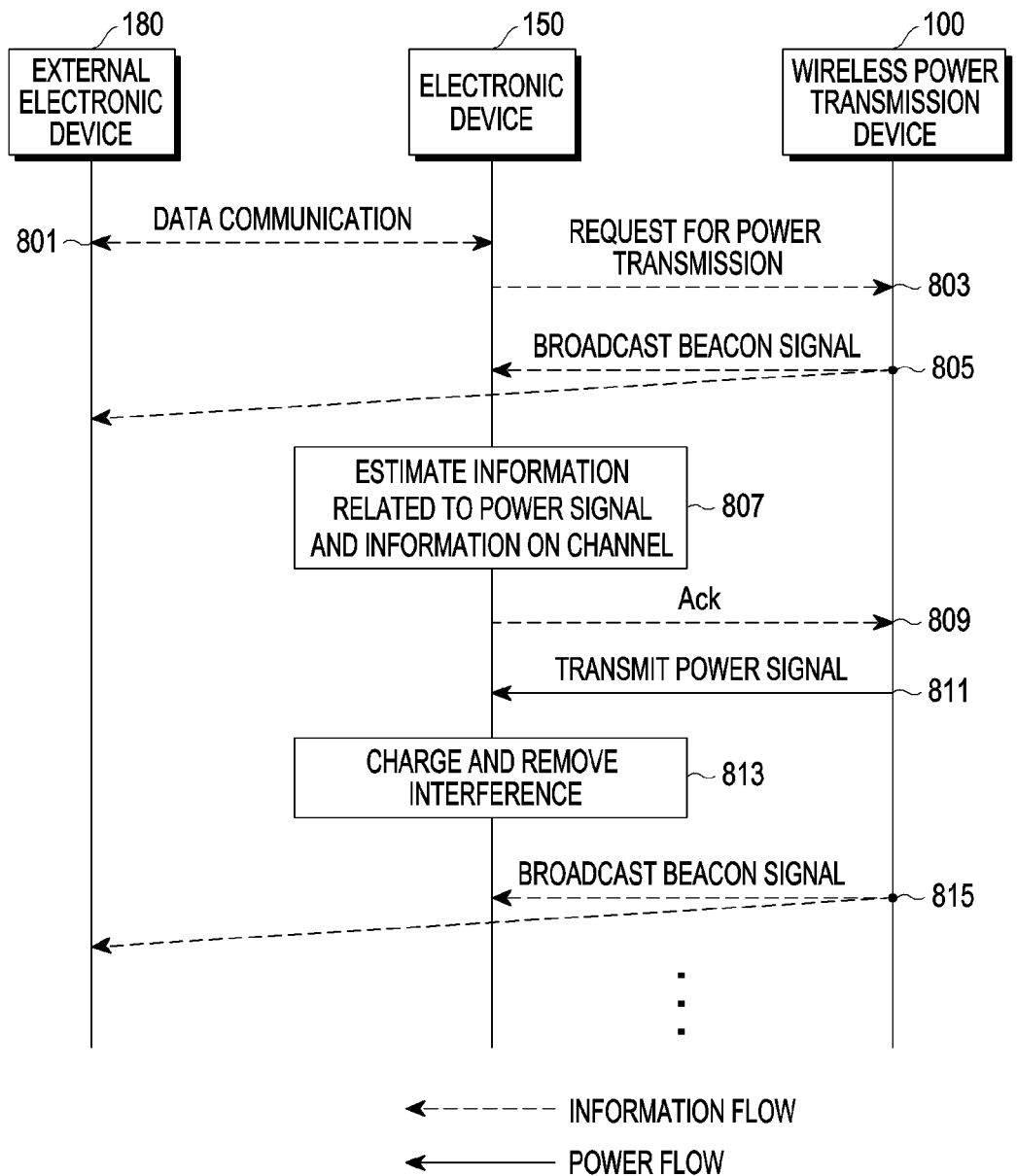
FIG. 8 illustrates an embodiment in which the electronic device removes the interference signal caused by the power signal from the data communication signal while the electronic device receives the power signal from the wireless power transmission device according to various embodiments of the disclosure.

FIG. 8 illustrates an embodiment in which the electronic device removes the interference signal caused by the power signal from the data communication signal while the electronic device receives the power signal from the wireless power transmission device according to various embodiments of the disclosure.

Hereinafter, various embodiments of the disclosure will be described with reference to FIGS. 7 and 8. The embodiments of FIG. 7 are described in more detail with reference to FIG. 8.

According to various embodiments, the electronic device 150 (for example, the processor 155 or the processor of the communication circuit 157 of FIG. 1) may perform data communication for transmitting and receiving the data communication signal 107 to and from the external electronic device 180 through the communication circuit 157 or the second sub communication circuit 159 in operation 701. For example, as illustrated in FIG. 8, the electronic device 150 may perform data communication 801 for transmitting and receiving the data communication signal 107 to and from the external electronic device 180 in operation 801.

According to various embodiments, the electronic device 150 (for example, the processor 155 or the processor of the communication circuit 157 of FIG. 1) may transmit a signal requesting for transmitting power to the wireless power transmission device 100 through the communication circuit 157 or the first sub communication circuit 158 in operation 703. For example, as illustrated in FIG. 8, the electronic device 150 may transmit the signal requesting for transmitting power to the wireless power transmission device 100 in operation 803.

According to various embodiments, the electronic device 150 (for example, the processor 155 or a processor of the communication circuit 157 of FIG. 1) may receive information related to the power signal 106 from the wireless power transmission device 100 through one of the communication circuit 157, the first sub communication circuit 158, or the power reception antenna 151 and estimate information on a channel with the wireless power transmission device 100 in operation 705. The electronic device 150 may receive the beacon signal 108 including information related to the power signal 106 from the wireless power transmission device 100 and estimate information on the channel with the wireless power transmission device 100 on the basis of the beacon signal 108. For example, as illustrated in FIG. 8, as the wireless power transmission device 100 receives the signal requesting for transmitting power from the electronic device 150 in operation 603, the wireless power transmission device 100 may broadcast the beacon signal to the electronic device 150 and the external electronic device 180 in operation 805. The electronic device 150 may receive the beacon signal from the wireless power transmission device 100 in response to transmission of the signal requesting for transmitting power to the wireless power transmission device. In another example, as illustrated in FIG. 8, the wireless power transmission device 100 may broadcast the beacon signal to the electronic device 150 and the external electronic device 180 at preset time intervals in operation 815, and accordingly, the electronic device 150 may receive the beacon signal at preset time intervals.

According to various embodiments, the electronic device 150 may identify information related to the power signal 106 included in the beacon signal received from the wireless power transmission device 100 and estimate information on a channel with the wireless power transmission device 100 on the basis of the beacon signal 108. For example, as illustrated in FIG. 8, the electronic device 150 may identify information related to the power signal 106 including at least one piece of information on a complex number specifying the power signal 106 or information on a transmission intensity of the power signal 106 from the beacon signal, and may estimate information on the channel including at least one piece of information on the gain of the channel and the phase of the channel in operation 807. After estimating the information on the channel with the wireless power transmission device 100, the electronic device 150 may transmit Ack including a channel feedback to the wireless power transmission device 100 in operation 809. In response to reception of the Ack from the electronic device 150, the wireless power transmission device 100 may form the power signal 106 in a direction of the electronic device 150 in operation 811. The electronic device 150 may charge power using the power signal 106 received from the wireless power transmission device 100 in operation 813. In this case, an interference signal caused by the power signal 106 formed by the wireless power transmission device 100 may be generated in the data communication signal 107 between the electronic device 150 and the external electronic device 180.

According to various embodiments, the electronic device 150 (for example, the processor 155 or the processor of the communication circuit 157 of FIG. 1) may remove an interference signal from the data communication signal 107 on the basis of information related to the power signal 106 and information on the channel with the wireless power transmission device 100 before decoding the data communication signal 107 through the communication circuit 157 or the second sub communication circuit 159 while receiving the power signal 106 formed by the wireless power transmission device 100 through the power reception antenna 151 in operation 707. For example, as illustrated in FIG. 8, the electronic device 150 may remove the interference signal from the data communication signal 107 on the basis of the information related to the power signal 106 and the information on the channel with the wireless power transmission device 100 while receiving the power signal 106. The electronic device 150, according to various embodiments, may calculate a digital signal corresponding to the interference signal using the equation of $g*\sqrt{P_T}*s[k]$. In the equation, g denotes information on the channel, $\sqrt{P_T}$ denotes information on the transmission intensity of the power signal 106, and s[k] denotes information on the complex number specifying the power signal 106. The electronic device 150 may identify that the form of the digital signal of the data communication signal 107 is y[k] and subtract the form of the digital signal of $g*\sqrt{P_T}*s[k]$ corresponding to the interference signal from y[k]. For example, the electronic device 150 may remove the digital signal (for example, $g*\sqrt{P_T}*s[k]$) corresponding to the interference signal from the data communication signal 107 (for example, y[k]) which is the form of the digital signal on the basis of the equation of $y[k]-g*\sqrt{P_T}*s[k]$. The electronic device 150 according to various embodiments may receive a beacon signal including information related to the power signal 106 and information on a channel at preset time intervals and identify the same, and when the information related to the power signal 106 and the information on the channel are changed, remove the changed interference signal from the data communication signal 107 on the basis of the changed information on the power signal 106 and the changed information on the channel before decoding the data communication signal 107 through the communication circuit 157 or the second sub communication circuit 159.

According to various embodiments, the electronic device 150 (for example, the processor 155 or the processor of the communication circuit 157 of FIG. 1) may decode a signal obtained by removing the digital signal corresponding to the interference signal from the digital signal corresponding to the data communication signal 107 through the communication circuit 157 or the second sub communication circuit 159 in operation 709.

The electronic device according to various embodiments disclosed in this document may be various types of electronic devices. The electronic device may include, for example, a portable communication device (for example, a smartphone), a computer device, a portable multimedia device, a portable medical device, a camera, a wearable device, or a home appliance. The electronic device according to an embodiment of this document is not limited to the above-described devices.

The various embodiments and the terms used herein are not intended to limit the technical features disclosed herein to specific implementation forms, and should be understood to include various modifications, equivalents, and/or alternatives to the corresponding embodiments. In connection with the description of drawings, similar reference numerals may be used for similar or relative elements. A singular form corresponding to an item may include one or a plurality of items unless clearly specially indicated in context. In the disclosure, each of the phrases of "A or B", "at least one of A and B", "at least one of A or B", "A, B, or C", "at least one of A, B, and C", and "at least one of A, B, or C" may include all available combinations of the listed items in the corresponding phrase in the phrases. The terms "first" or "second" may be merely used to separate the corresponding element from another corresponding element, and the corresponding elements are not limited in another aspect (for example, importance or sequence). When any (for example, first) element is "coupled with" or "connected with" another (for example, second) element "functionally" or "in communication" or without "functionally" or "in communication", it means that the element may be connected to the other element directly (for example, wiredly), wirelessly, or through a third element.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a portion thereof. For example, according to an embodiment, the module may be implemented in the form of an Application-Specific Integrated Circuit (ASIC).

Various embodiments of this disclosure may be implemented as commands (or software (for example, the program 140) including instructions) stored in a machine (for example, the electronic device 101)-readable storage medium (for example, the internal memory 136 or the external memory 138). For example, the machine (for example, the processor (for example, the processor 120) of the electronic device 101) may load at least one command among the stored one or more commands from the storage medium and execute the command. This allows the device to perform at least one function according to at least one loaded command. The one or more commands may include code generated by a compiler or code which can be executed by an interpreter. The machine-readable storage medium may be provided in the form of a nontransitory storage medium. The term "nontransitory" means that the storage medium is a tangible device and does not include a signal (for example, an electromagnetic wave), and does not separate the case in which data is semipermanently stored in the storage medium from the case in which data is temporarily stored therein.

According to an embodiment, a method according to various embodiments disclosed in this document may be provided while being included in a computer program product. The computer program product may be traded as a product between a seller and a buyer. The computer program product may be distributed in the form of a machine-readable storage medium (for example, a Compact Disc Read-Only Memory (CD-ROM)) or distributed online (for example, downloaded or uploaded) through an application store (for example, Play Store™) or directly between two user devices (for example, smartphones). If distributed online, at least a portion of the computer program products may be at least temporarily stored in or temporarily generated by the machine-readable storage medium, such as a memory of the manufacturer's server, a server of the application store, or a relay server.

According to various embodiments, each of the elements (for example, the module or the program) may include singular or plural entities. According to various embodiments, one or more of the corresponding elements or operations may be omitted, or one or more other elements or operations may be added. Alternatively or additionally, a plurality of elements (for example, the module or the program) may be integrated into one element. In this case, the integrated element may perform one or more functions of each of the plurality of elements in the same way or similarly to being performed by the corresponding element among the plurality of elements before the integration. According to various embodiments, operations performed by the module, the program, or another element may be sequentially, in parallel, repeatedly, or heuristically executed, or one or more of the operations may be executed in another order, or omitted, or one or more other operations may be added.

According to various embodiments, the electronic device 150 may include the communication circuit 157 configured to receive a data communication signal including an interference signal caused by a power signal generated by a wireless power transmission device and at least one processor 155, and the at least one processor 155 may receive information related to the power signal from the wireless power transmission device through the communication circuit 157, estimate information on a channel with the wireless power transmission device, and remove the interference signal from the data communication signal on the basis of the information related to the power signal and the information on the channel before decoding the data communication signal through the communication circuit 157.

According to various embodiments, the information related to the power signal may include at least one piece of information on a complex number specifying the power signal or information on a transmission intensity of the power signal, and the information on the channel may include information on a gain of the channel and a phase of the channel.

According to various embodiments, the at least one processor 155 may be configured to receive a beacon signal including the information related to the power signal from the wireless power transmission device through the communication circuit 157 and estimate the information on the channel using the beacon signal.

According to various embodiments, the at least one processor 155 may be configured to receive the beacon signal at preset time intervals through the communication circuit 157, and when the information related to the power signal and the information on the channel are changed, remove a changed interference signal from the data communication signal on the basis of the changed information related to the power signal and the changed information on the channel before decoding the data communication signal through the communication circuit 157.

According to various embodiments, the communication circuit 157 may include the demodulator 402, the Analog-to-Digital Converter (ADC) 403, and the decoder 405, and the at least one processor 155 may be configured to demodulate the data communication signal, which is a signal in a radio frequency band (Radio Frequency (RF) signal) or a signal in an intermediate frequency band (Intermediate Frequency (IF) signal), to a baseband signal, through the demodulator, convert the data communication signal demodulated to the baseband signal into a form of the digital signal through the ADC 403, and decode a signal obtained by removing a digital signal corresponding to the interference signal from the digital signal through the decoder 405.

According to various embodiments, the communication circuit 157 may include the interference remover 404, and the at least one processor 155 may be configured to calculate the interference signal caused by the power signal on the basis of an equation of $g*\sqrt{P_T}*s[k]$, through the interference remover 404, g being information on the channel, $\sqrt{P_T}$ being information on a transmission intensity of the power signal, and s[k] being information on a complex number specifying the power signal, and remove the calculated interference signal from the data communication signal.

According to various embodiments, the communication circuit 157 may include the first sub communication circuit 158 and the second sub communication circuit 159, the first sub communication circuit 158 may be configured to receive the information related to the power signal and estimate the information on the channel with the wireless power transmission device 100, the second sub communication circuit 159 may be configured to receive the data communication signal, a band of a second frequency used by the second sub communication circuit 158 may be a frequency band higher than a first frequency used by the first sub communication circuit 159, and a frequency band of the power signal may correspond to the band of the second frequency used by the second sub communication circuit.

According to various embodiments, the at least one processor 155 may be configured to transmit a signal requesting for transmitting power to the wireless power transmission device through the communication circuit 157.

According to various embodiments, the electronic device may further include at least one power reception antenna 151 configured to transmit power using the power signal formed by the wireless power transmission device, and the at least one processor 155 may be configured to receive the information related to the power signal from the wireless power transmission device through the communication circuit 157 in response to transmission of the signal requesting for transmitting the power, estimate the information on the channel with the wireless power transmission device, and remove the interference signal from the data communication signal on the basis of the information related to the power signal and the information on the channel through the communication circuit 157 while receiving the power signal formed by the wireless power transmission device through the at least one power reception antenna 151.

According to various embodiments, a method of operating the electronic device 150 removing an interference signal may include an operation of receiving a data communication signal including an interference signal caused by a power signal generated by a wireless power transmission device, an operation of receiving information related to the power signal from the wireless power transmission device through a communication circuit and estimating information on a channel with the wireless power transmission device, and an operation of removing the interference signal from the data communication signal on the basis of the information related to the power signal and the information on the channel before decoding the data communication signal through the communication circuit.

According to various embodiments, the method of operating the electronic device 150 removing the interference signal may further include an operation of converting the data communication signal into a digital signal and an operation of removing a digital signal corresponding to the interference signal from the digital signal through the communication circuit.

According to various embodiments, the operation of receiving the information related to the power signal and the information on the channel with the wireless power transmission device may include an operation of receiving a beacon signal including the information related to the power signal from the wireless power transmission device through the communication circuit and an operation of estimating the information on the channel using the beacon signal.

According to various embodiments, the operation of receiving the information related to the power signal and the information on the channel with the wireless power transmission device may include an operation of receiving the beacon signal at preset time intervals through the communication circuit, and the operation of removing the interference signal from the data communication signal may include an operation of, when the information related to the power signal and the information on the channel are changed, removing a changed interference signal from the data communication signal on the basis of the changed information related to the power signal and the changed information on the channel before decoding the data communication signal through the communication circuit.

According to various embodiments, the method of operating the electronic device 150 removing the interference signal may further include an operation of demodulating the data communication signal, which is a signal in a radio frequency band (Radio Frequency (RF) signal) or a signal in an intermediate frequency band (Intermediate Frequency (IF) signal), to a baseband signal, through a demodulator of the communication circuit, an operation of converting the data communication signal demodulated to the baseband signal into a form of the digital signal through an ADC of the communication circuit, and an operation of decoding a signal obtained by removing a digital signal corresponding to the interference signal from the digital signal through a decoder of the communication circuit.

According to various embodiments, the operation of removing the interference signal from the data communication signal may include an operation of calculating the interference signal caused by the power signal on the basis of an equation of $g*\sqrt{P_T}*s[k]$, g being information on the channel, $\sqrt{P_T}$ being information on a transmission intensity of the power signal, and s[k] being information on a complex number specifying the power signal, and an operation of removing the calculated interference signal from the data communication signal.

According to various embodiments, the method of operating the electronic device 150 removing the interference signal may further include an operation of transmitting a signal requesting for transmitting power to the wireless power transmission device through the communication circuit.

According to various embodiments, the operation of receiving the information related to the power signal and the information on the channel with the wireless power transmission device may include an operation of receiving the information related to the power signal from the wireless power transmission device through the communication circuit in response to transmission of the signal requesting for transmitting the power and estimating the information on the channel with the wireless power transmission device, and the operation of removing the interference signal from the data communication signal may include an operation of removing the interference signal from the data communication signal on the basis of the information related to the power signal and the information on the channel through the communication circuit while receiving the power signal formed by the wireless power transmission device through at least one power reception antenna.

According to various embodiments, a computer-readable recording medium recording a program for performing a method of operating the electronic device 150 including the communication circuit 157, at least one processor 155 operatively connected to the communication circuit 157, and the memory 156 is provided. The method may include an operation of receiving a data communication signal including an interference signal caused by a power signal generated by a wireless power transmission device, receiving information related to the power signal from the wireless power transmission device through a communication circuit and estimating information on a channel with the wireless power transmission device, and an operation of removing the interference signal from the data communication signal on the basis of the information related to the power signal and the information on the channel before decoding the data communication signal through the communication circuit.

The invention claimed is:

1. An electronic device comprising:
a communication circuit comprising a first communication circuit and a second communication circuit; and
at least one processor,
wherein the at least one processor is configured to:
receive a beacon signal including information related to a power signal from a wireless power transmission device, through the first communication circuit, wherein the information related to the power signal comprises information on a transmission intensity of the power signal and information on a complex number signal specifying the power signal,
estimate, based at least on the information included in the beacon signal, information on a channel between the wireless power transmission device and the electronic device,
receive a data communication signal including a data signal from an external electronic device and an interference signal caused by the power signal, through the second communication circuit,
convert the data communication signal into a first digital signal,
obtain a second digital signal by subtracting a digital signal corresponding to the interference signal from the first digital signal, wherein the digital signal corresponding to the interference signal is identified based on the information on the transmission intensity of the power signal, the information on the complex number signal specifying the power signal, and the information on the channel, and
decode the second digital signal.

2. The electronic device of claim 1, wherein the at least one processor is configured to:
receive the beacon signal at preset time intervals, through the first communication circuit, and
when the information related to the power signal and the information on the channel are changed, remove the interference signal from the received data communication signal, based on the changed information related to the power signal and the changed information on the channel.

3. The electronic device of claim 1, wherein the communication circuit comprises a demodulator, an Analog-to-Digital Converter (ADC), and a decoder, and
the at least one processor is configured to:
control the demodulator to demodulate the received data communication signal, which is a signal in a radio frequency band (Radio Frequency (RF) signal) or a signal in an intermediate frequency band (Intermediate Frequency (IF) signal), to a baseband signal,
control the ADC to convert the demodulated data communication signal into the first digital signal, and
control the decoder to decode the second digital signal obtained by subtracting the digital signal corresponding to the interference signal from the first digital signal.

4. The electronic device of claim 1, wherein the at least one processor is configured to:
control the communication circuit to calculate the interference signal caused by the power signal, based on an equation of $g*\sqrt{P_T}*s[k]$, g being the information on the channel, $\sqrt{P_T}$ being the information on the transmission intensity of the power signal, and s[k] being the information on the complex number specifying the power signal, and
control the communication circuit to remove the calculated interference signal from the received data communication signal.

5. The electronic device of claim 1, wherein a band of a second frequency used by the second communication circuit is a frequency band higher than a first frequency used by the first communication circuit, and a frequency band of the power signal corresponds to the band of the second frequency used by the second communication circuit.

6. The electronic device of claim 1, wherein the at least one processor is configured to control the communication circuit to transmit, to the wireless power transmission device, a signal requesting for transmitting power.

7. The electronic device of claim 6, further comprising at least one power reception antenna configured to receive power using the power signal formed by the wireless power transmission device,
wherein the at least one processor is configured to:
receive the beacon signal from the wireless power transmission device through the first communication circuit in response to transmission of the signal requesting for transmitting the power, and
remove the interference signal from the received data communication signal, while receiving the power signal formed by the wireless power transmission device through the at least one power reception antenna.

8. A method of operating an electronic device, comprising a communication circuit including a first communication circuit and a second communication circuit, to remove an interference signal, the method comprising:
receiving, through the second communication circuit, a data communication signal including a data signal from an external electronic device and an interference signal caused by a power signal generated by a wireless power transmission device;
receiving, through the first communication circuit, a beacon signal including information related to the power signal from the wireless power transmission device, wherein the information related to the power signal comprises information on a transmission intensity of the power signal and information on a complex number signal specifying the power signal;
estimating, based at least on the information included in the beacon signal, information on a channel between the wireless power transmission device and the electronic device;
converting the data communication signal into a first digital signal;
obtaining a second digital signal by subtracting a digital signal corresponding to the interference signal from the first digital signal, wherein the digital signal corresponding to the interference signal is identified based on the information on the transmission intensity of the power signal, the information on the complex number signal specifying the power signal, and the information on the channel, and
decoding the second digital signal.

9. The method of claim 8, further comprising:
receiving the beacon signal at preset time intervals, through the first communication circuit, and
when the information related to the power signal and the information on the channel are changed, removing the interference signal from the received data communication signal based on the changed information related to the power signal and the changed information on the channel.

10. The method of claim 8, further comprising:
demodulating the received data communication signal, which is a signal in a radio frequency band (Radio Frequency (RF) signal) or a signal in an intermediate frequency band (Intermediate Frequency (IF) signal), to a baseband signal;
converting the demodulated data communication signal into the first digital signal; and
decoding the second digital signal obtained by subtracting the digital signal corresponding to the interference signal from the first digital signal.

11. The method of claim 8, further comprising:
calculating the interference signal caused by the power signal, based on an equation of $g*\sqrt{P_T}*s[k]$, g being the information on the channel, $\sqrt{P_T}$ being the information on the transmission intensity of the power signal, and s[k] being the information on the complex number specifying the power signal; and
removing the calculated interference signal from the received data communication signal.

12. The method of claim 8, further comprising transmitting a signal requesting for transmitting power to the wireless power transmission device.

13. The method of claim 12, further comprising:
receiving the beacon signal from the wireless power transmission device in response to transmission of the signal requesting for transmitting the power; and
removing the interference signal from the received data communication signal, while receiving the power signal formed by the wireless power transmission device.

14. A non-transitory computer-readable recording medium recording a program which, when executed, control an electronic device comprising a communication circuit including a first communication circuit and a second communication circuit, at least one processor operatively connected to the communication circuit, and a memory, to perform operations comprising:
receiving, through the second communication circuit, a data communication signal including a data signal from an external electronics device and an interference signal caused by a power signal generated by a wireless power transmission device;
receiving, through the first communication circuit, a beacon signal including information related to the power signal from the wireless power transmission device, wherein the information related to the power signal comprises information on a transmission intensity of the power signal and information on a complex number signal specifying the power signal;
estimating, based at least on the information included in the beacon signal, information on a channel between the wireless power transmission device and the electronic device;

converting the data communication signal into a first digital signal;

obtaining a second digital signal by subtracting a digital signal corresponding to the interference signal from the first digital signal, wherein the digital signal corresponding to the interference signal is identified based on the information on the transmission intensity of the power signal, the information on the complex number signal specifying the power signal, and the information on the channel, and decoding the second digital signal.

* * * * *